US012770945B2

(12) United States Patent
Kim

(10) Patent No.: US 12,770,945 B2
(45) Date of Patent: Oct. 20, 2026

(54) BATTERY PACK AND METHOD OF CONTROLLING THE SAME

(71) Applicant: Samsung SDI Co., Ltd., Yongin-si (KR)

(72) Inventor: Jeongho Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1101 days.

(21) Appl. No.: 17/572,380

(22) Filed: Jan. 10, 2022

(65) Prior Publication Data

US 2022/0231349 A1 Jul. 21, 2022

(30) Foreign Application Priority Data

Jan. 19, 2021 (KR) ........................ 10-2021-0007672

(51) Int. Cl.
*H01M 10/48* (2006.01)
*H01M 10/42* (2006.01)
(Continued)

(52) U.S. Cl.
CPC ..... *H01M 10/482* (2013.01); *H01M 10/4257* (2013.01); *H01M 10/486* (2013.01);
(Continued)

(58) Field of Classification Search
CPC ........... H01M 10/482; H01M 10/4257; H01M 10/486; H01M 2010/4271; H02J 7/00306; H02J 7/0024
See application file for complete search history.

(56) References Cited

U.S. PATENT DOCUMENTS 8,854,780 B2 10/2014 Jung et al.
9,865,901 B2 1/2018 Hwang
(Continued)

FOREIGN PATENT DOCUMENTS

JP 2016-015810 A 1/2016
KR 10-2013-0066462 A 6/2013
(Continued)

OTHER PUBLICATIONS

John Warner, Chapter 4—Battery Pack Design Criteria and Selection, The Handbook of Lithium-Ion Battery Pack Design, 2015 (Year: 2015).*
(Continued)

*Primary Examiner* — Maria V Ewald
*Assistant Examiner* — Suhani Jitendra Patel
(74) *Attorney, Agent, or Firm* — Womble Bond Dickinson (US) LLP

(57) ABSTRACT

A battery pack includes: a pair of external terminals; a pair of first connection terminals; a first battery comprising a plurality of first battery strings connected in parallel between the pair of first connection terminals, each of the plurality of first battery strings comprising a plurality of first battery cells connected in series; an extended battery module comprising a pair of second connection terminals detachably connected to the pair of first connection terminals, and a second battery comprising a plurality of second battery strings connected in parallel between the pair of second connection terminals; and a battery management system (BMS) configured to determine a current protection level based on a total number of the plurality of first battery strings and the plurality of second battery strings, in response to the extended battery module being connected to the pair of first connection terminals.

14 Claims, 5 Drawing Sheets

(51) Int. Cl.

| | |
|---|---|
| ***H02J 7/50*** | (2026.01) |
| ***H02J 7/63*** | (2026.01) |

(52) U.S. Cl.

CPC ................ *H02J 7/575* (2026.01); *H02J 7/63* (2026.01); *H01M 2010/4271* (2013.01)

(56) References Cited

U.S. PATENT DOCUMENTS

| | | | | |
|---|---|---|---|---|
| 10,347,952 | B2 | 7/2019 | Choi et al. | |
| 2013/0106355 | A1* | 5/2013 | Kim | H02J 7/0025 320/118 |
| 2013/0335028 | A1 | 12/2013 | Choi | |
| 2015/0194707 | A1 | 7/2015 | Park | |
| 2016/0226263 | A1* | 8/2016 | Seo | H02J 7/005 |
| 2017/0104349 | A1* | 4/2017 | Toya | H02J 7/0045 |
| 2019/0305263 | A1* | 10/2019 | Kaneko | G01R 31/392 |
| 2020/0083511 | A1* | 3/2020 | Seol | H01M 50/505 |
| 2020/0161877 | A1* | 5/2020 | Zhang | H02J 7/00302 |
| 2020/0244075 | A1 | 7/2020 | Park et al. | |
| 2020/0274368 | A1* | 8/2020 | Crouse, Jr. | B64U 50/19 |
| 2022/0260637 | A1* | 8/2022 | Park | H01M 10/488 |
| 2023/0264596 | A1* | 8/2023 | Ko | H01M 10/4207 320/109 |

FOREIGN PATENT DOCUMENTS

| | | | |
|---|---|---|---|
| KR | 10-1429747 | B1 | 8/2014 |
| KR | 10-2015-0064368 | A | 6/2015 |
| KR | 10-2016-0143092 | A | 12/2016 |
| KR | 10-2017-0022417 | A | 3/2017 |
| KR | 10-2017-0052954 | A | 5/2017 |
| KR | 10-1987805 | B1 | 6/2019 |

OTHER PUBLICATIONS

Weicker, Phillip. (2014). <i>Systems Approach to Lithium-Ion Battery Management.</i> Artech House. Retrieved from <br>https://app.knovel.com/hotlink/toc/id:kpSALIBM02/systems-approach-lithium/systems-approach-lithium (Year: 2014).*

Plett, Gregory L.. (2016). <i>Battery Management Systems, vol. 2—Equivalent-Circuit Methods.</i> Artech House. Retrieved from <br>https://app.knovel.com/hotlink/toc/id:kpBMSVECM3/battery-management-systems/battery-management-systems (Year: 2016).*

Https://web.archive.org/web/20181018181256/https://www.electronics-tutorials.ws/dccircuits/kirchhoffs-current-law.html (Year: 2018).*

Korean Office Action issued Jun. 5, 2023, in corresponding KR Patent Application No. 10-2021-0007672 (55 pages).

Korean Office Action dated Nov. 23, 2022, issued in corresponding Korean Patent Application No. 10-2021-0007672 (48 pages).

EPO Extended European Search Report dated Jun. 10, 2022, issued in European Patent Application No. 22150678.5 (8 pages).

* cited by examiner

BATTERY PACK AND METHOD OF CONTROLLING THE SAME

CROSS-REFERENCE TO RELATED APPLICATION

The present application claims priority to and the benefit of Korean Patent Application No. 10-2021-0007672, filed on Jan. 19, 2021, in the Korean Intellectual Property Office, the entire disclosure of which is incorporated herein by reference.

BACKGROUND

1. Field

Aspects of some embodiments of the present disclosure relate to a battery pack and a method of controlling the battery pack.

2. Description of the Related Art

As a demand for portable electronic products has increased, research into high performance secondary batteries capable of being repeatedly charged and discharged has been actively conducted. Commercialized secondary batteries include, for example, nickel cadmium batteries, nickel hydrogen batteries, nickel zinc batteries, lithium secondary batteries, and the like. Among the batteries, lithium secondary batteries have relatively low memory effect compared with nickel-based secondary batteries, and thus, are freely charged/discharged and exhibit a very low self-discharge rate and a high energy density.

A battery pack generally includes a plurality of battery cells connected in series and/or parallel. As a battery having a plurality of battery cells connected to each other is repeatedly charged/discharged in the form of a battery pack, a problem of controlling the state of the battery pack occurs. A battery management system (BMS) is provided to monitor and control state information of a voltage, a current, a temperature, and the like of each battery cell so that the battery pack can be operated smoothly. The BMS performs a function of stably maintaining and controlling the battery pack through data exchange with peripheral equipment such as a power control system (PCS), heating, ventilating, and air conditioning (HVAC), and the like.

The battery pack includes a battery cell and a peripheral circuit or protection circuit including a charging/discharging circuit. When the battery pack is connected to external power through an external terminal, a battery cell is charged by the external power supplied through the external terminal and the charging/discharging circuit. When a load is connected through the external terminal, the power of the battery cell is supplied to the load through the external terminal. In this state, generally, the battery cells are used by being connected in series and parallel to match the consumption capacity of the load.

In some systems, a battery may be used as one individually operable battery pack unit including battery cells and a BMS, and the battery capacity may be limited because the battery pack contains fixed battery cells. Accordingly, when the performance of the battery cell deteriorates, a battery pack user has the inconvenience of replacing the battery pack or replacing the battery cell inside the battery pack. In response to this, a technology for increasing battery capacity and battery use time without replacing the battery pack is required.

The above information disclosed in this Background section is only for enhancement of understanding of the background and therefore the information discussed in this Background section does not necessarily constitute prior art.

SUMMARY

Aspects of some embodiments of the present disclosure relate to a battery pack and a method of controlling the battery pack, and for example, to a battery pack having an extended battery capacity using an extended battery module, and a method of controlling the battery pack.

Aspects of some embodiments include a battery pack having an extended battery capacity using an extended battery module.

Furthermore, aspects of some embodiments include a battery pack which controls an extended battery module when battery capacity is extended using an extended battery module, and a method of controlling the battery pack.

Furthermore, aspects of some embodiments include a battery pack which stably controls an extended battery module by determining a current protection level when battery capacity is extended using a battery module, and a method of controlling the battery pack.

Furthermore, aspects of some embodiments include a battery pack which stably controls a battery module using battery information when battery capacity is extended using the extended battery module, and a method of controlling the battery pack.

Additional aspects will be set forth in part in the description which follows and, in part, will be apparent from the description, or may be learned by practice of the presented embodiments of the disclosure.

A battery pack according to various embodiments of the disclosure includes a pair of external terminals, a pair of first connection terminals, a first battery including a plurality of first battery strings connected in parallel between the pair of first connection terminals, each of the plurality of first battery strings including a plurality of first battery cells connected in series, an extended battery module including a pair of second connection terminals detachably connected to the pair of first connection terminals, and a second battery including a plurality of second battery strings connected in parallel between the pair of second connection terminals, and a battery management system (BMS) configured to determine a current protection level based on a total number of the plurality of first battery strings and the plurality of second battery strings, when the extended battery module is connected to the pair of first connection terminals.

According to some embodiments, the battery pack may further include a switch between one of the pair of external terminals and one of the pair of first connection terminals, wherein the battery management system is further configured to compare a total current of the first battery and the second battery connected in parallel to each other with the current protection level, and to control the switch based on a result of the comparison.

According to some embodiments, the battery pack may further include a first analog front end (AFE) circuit configured to generate first sensing data by detecting a state of the plurality of first battery cells in the first battery, and to transmit the first sensing data to the battery management system, wherein each of the plurality of second battery strings includes a plurality of second battery cells connected in series, and the extended battery module includes a second AFE circuit configured to generate second sensing data by detecting a state of the plurality of second battery cells in the second battery, and to transmit the second sensing data to the battery management system.

According to some embodiments, the battery pack may further include a first communication line between the battery management system and the first AFE circuit, and a second communication line configured to connect between the first AFE circuit and the second AFE circuit when the extended battery module is connected to the pair of first connection terminals.

According to some embodiments, the second sensing data may be transmitted to the battery management system through the second communication line and the first communication line.

According to some embodiments, the battery pack may further include a first communication terminal, wherein the extended battery module further includes a second communication terminal connected to the first communication terminal, and the second communication line is configured as the first communication terminal and the second communication terminal are electrically connected to each other.

According to some embodiments, the battery management system, the first AFE circuit, and the second AFE circuit may transceive data with respect to one another through the first communication line and the second communication line using a controller area network (CAN) protocol.

According to some embodiments, the first AFE circuit may be configured to detect a temperature of the first battery and transmit the temperature of the first battery to the battery management system, the second AFE circuit may be configured to detect a temperature of the second battery and transmit the temperature of the second battery to the battery management system, and the battery management system may be further configured to determine an overcharge current protection level based on the total number of the plurality of first battery strings and the plurality of second battery strings, the temperature of the first battery, and the temperature of the second battery.

According to some embodiments, the second AFE circuit may include a memory storing battery information about the second battery, and the second AFE circuit may be configured to transmit the battery information to the battery management system when the extended battery module is connected to the pair of first connection terminals.

According to some embodiments, the battery information may include information about the number of the plurality of second battery strings.

According to some embodiments, the battery information may include at least one of identification information of the extended battery module or information about the number of the plurality of second battery cells included in each of the plurality of second battery strings.

According to some embodiments, the battery management system may be further configured to compare the identification information with a preset identification information, and when the identification information does not match the preset identification information, open a switch between one of the pair of external terminals and one of the pair of first connection terminals.

According to some embodiments, the number of the plurality of first battery strings may be different from the number of the plurality of second battery strings.

According to some embodiments, the battery management system may be further configured to determine an overcharge current protection level based on the total number of the plurality of first battery strings and the plurality of second battery strings, and to open the switch when a total charge current of the first battery and the second battery is greater than the overcharge current protection level for a preset second time.

According to some embodiments, the battery management system may be further configured to determine an overdischarge current protection level based on the total number of the plurality of first battery strings and the plurality of second battery strings, and to open the switch when a total charge current of the first battery and the second battery is less than the overdischarge current protection level for a preset first time.

According to some embodiments, the battery management system may be further configured to determine a current protection level when the extended battery module is connected to the pair of first connection terminals, to be greater than a current protection level when the extended battery module is not connected to the pair of first connection terminals.

According to some embodiments, the battery pack may further include a re-extended battery module including a pair of third connection terminals and a third battery including a plurality of third battery strings connected in parallel between the pair of third connection terminals, wherein the re-extended battery module further includes a pair of fourth connection terminals respectively connected to the pair of second connection terminals, and the pair of fourth connection terminals are connected to the pair of third connection terminals when the re-extended battery module is mounted on the extended battery module.

Various respective aspects and features of the present invention are defined in the appended claims. Combinations of the characteristics of dependent claims can be appropriately combined with the characteristics of independent claims, not just explicitly presented in the claims.

Furthermore, one or more characteristics selected from any one embodiment described in the disclosure may be combined with one or more characteristics selected from other embodiments described in the disclosure, and an alternative combination of the characteristics may at least partially reduce one or more technical problems discussed in the disclosure, or technical problems discernable by a typical technician from the disclosure, and furthermore, a particular combination or permutation of embodiment features is possible unless understood by the typical technician as being incompatible.

In any described example implementation described in the disclosure, two or more physically separate constituent elements may be alternatively integrated into a single constituent element, if the integration is possible, and when the same function is performed by the single constituent element, the integration is possible. Reversely, the single constituent element of any embodiment described in the disclosure may be alternatively implemented, if appropriate, as two or more separate constituent elements performing the same function.

The purpose of certain embodiments of the present invention is to at least partially solve, reduce, or remove at least one of problems and/or disadvantages related to the related art. Certain embodiments are to provide at least one of advantages described below.

BRIEF DESCRIPTION OF THE DRAWINGS

The above and other aspects, features, and characteristics of certain embodiments of the disclosure will be more apparent from the following description taken in conjunction with the accompanying drawings, in which.

DETAILED DESCRIPTION

Figure 1:
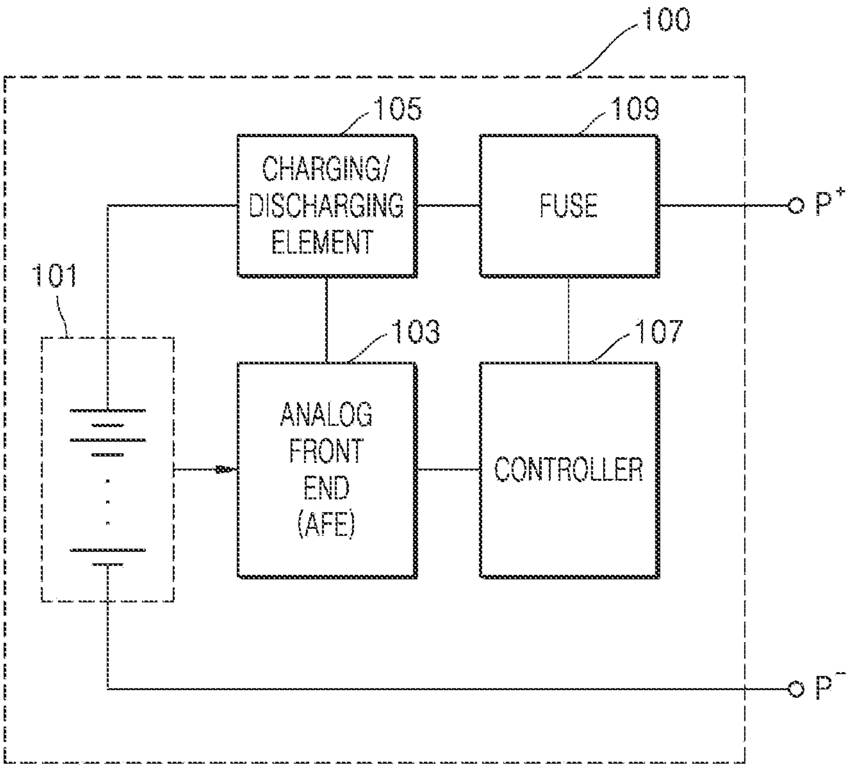
FIG. 1 illustrates a battery pack according to the related art.

Reference will now be made in more detail to aspects of some embodiments, which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Terms used in the specification are used for explaining a specific embodiment, not for limiting the disclosure. Thus, an expression used in a singular form in the specification also includes the expression in its plural form unless clearly specified otherwise in context. Unless defined otherwise, all terms used herein including technical or scientific terms have the same meanings as those generally understood by those of ordinary skill in the art to which the disclosure may pertain. The terms as those defined in generally used dictionaries are construed to have meanings matching that in the context of related technology and, unless clearly defined otherwise, are not construed to be ideally or excessively formal. In some cases, even a term defined in the disclosure cannot be construed to exclude embodiments of the disclosure.

In various embodiments of the disclosure described below, a hardware access method is described as an example. However, because various embodiments of the disclosure include technology using both hardware and software, various embodiments of the disclosure do not exclude a software-based access method.

Hereinafter, the disclosure relates to a battery pack for extending battery capacity of a battery pack and increasing battery use time by using an extended battery module, and a method of controlling the battery pack.

The disclosure relates to a battery pack for stably controlling the extended battery module by determining a current protection level when battery capacity is extended using the extended battery module, and a method of controlling the battery pack. In detail, the disclosure describes a battery pack using an extended battery pack and a technology for controlling the battery pack.

As the disclosure allows for various changes and numerous embodiments, aspects of some embodiments will be illustrated in the drawings and described in more detail in the written description. However, this is not intended to limit the disclosure to particular modes of practice, and it is to be appreciated that all changes, equivalents, and substitutes that do not depart from the spirit and technical scope of the disclosure are encompassed in the disclosure. In the description of the disclosure, certain detailed explanations of the related art are omitted when it is deemed that they may unnecessarily obscure the essence of the disclosure. In the description with reference to the drawings, the same or corresponding constituents are indicated by the same reference numerals and redundant descriptions thereof are omitted In the embodiments below, it will be understood that when a component is referred to as being "connected to" another component, it can be directly connected to the other component or indirectly connected to the other component via intervening components. It will be further understood that the terms "comprises" and/or "comprising" used herein specify the presence of stated features or components, but do not preclude the presence or addition of one or more other features or components.

Some embodiments may be described in terms of functional block components and various processing steps. Such functional blocks may be realized by any number of hardware and/or software components configured to perform the specified functions. For example, the functional blocks of the present disclosure may be implemented by one or more microprocessors, or by circuit configurations for a predetermined function. Furthermore, for example, the functional blocks of the present disclosure may be implemented in various programming or scripting languages. The functional blocks may be implemented as algorithms running on one or more processors. A function performed by a function block in the disclosure may be performed by a plurality of function blocks, or functions performed by a plurality of function blocks in the disclosure may be performed by one function block. Furthermore, the disclosure may employ conventional technology for electronic environment setting, signal processing, and/or data processing, and the like.

Furthermore, in the disclosure, in order to determine whether a specific condition is satisfied or fulfilled, an expression "exceeding" or "less than" is used, but this is only a description to express an example, not exclude use of an expression "or more" or "or less". Conditions described as "or more" can be replaced with "exceeding" and "or less" for conditions described as "less than" and "or more and less than" can be replaced with "exceeding and or less."

FIG. 1 illustrates an example battery pack 100. Hereinafter, terms " . . . portion," " . . . unit," and the like used below mean a unit for performing at least one function or operation, which may be implemented as hardware, software, or a combination of hardware and software.

Referring to FIG. 1, the battery pack 100 may include at least one battery cell 101, an analog front end (AFE), a charging/discharging element 105, a controller 107, a fuse 109, and pack terminals P+ and P−.

The AFE 103 detects a voltage, a temperature, and the like of the battery cell 101 and state information of the battery cell 101, and transmits the detected state information to the controller 107. The controller 107 performs a function to block overcharge and overdischarge of the battery cell 101 using the charging/discharging element 105 or the fuse 109, according to the state of the battery cell 101. When the battery cell 101 is identified to be in an overcharge and/or an overdischarge state, the controller 107 controls the charge and discharge of the battery cell 101 by outputting a control signal. The controller 107 may include a microcomputer.

In the battery pack 100 according to some systems, as the battery cell 101 is fixedly provided on the battery pack 100 and solely operated, battery capacity of the battery pack 100 has a limitation. Accordingly, when needing a battery with a long use time, a battery user may additionally use a separate battery pack or other source of power.

Figure 2:
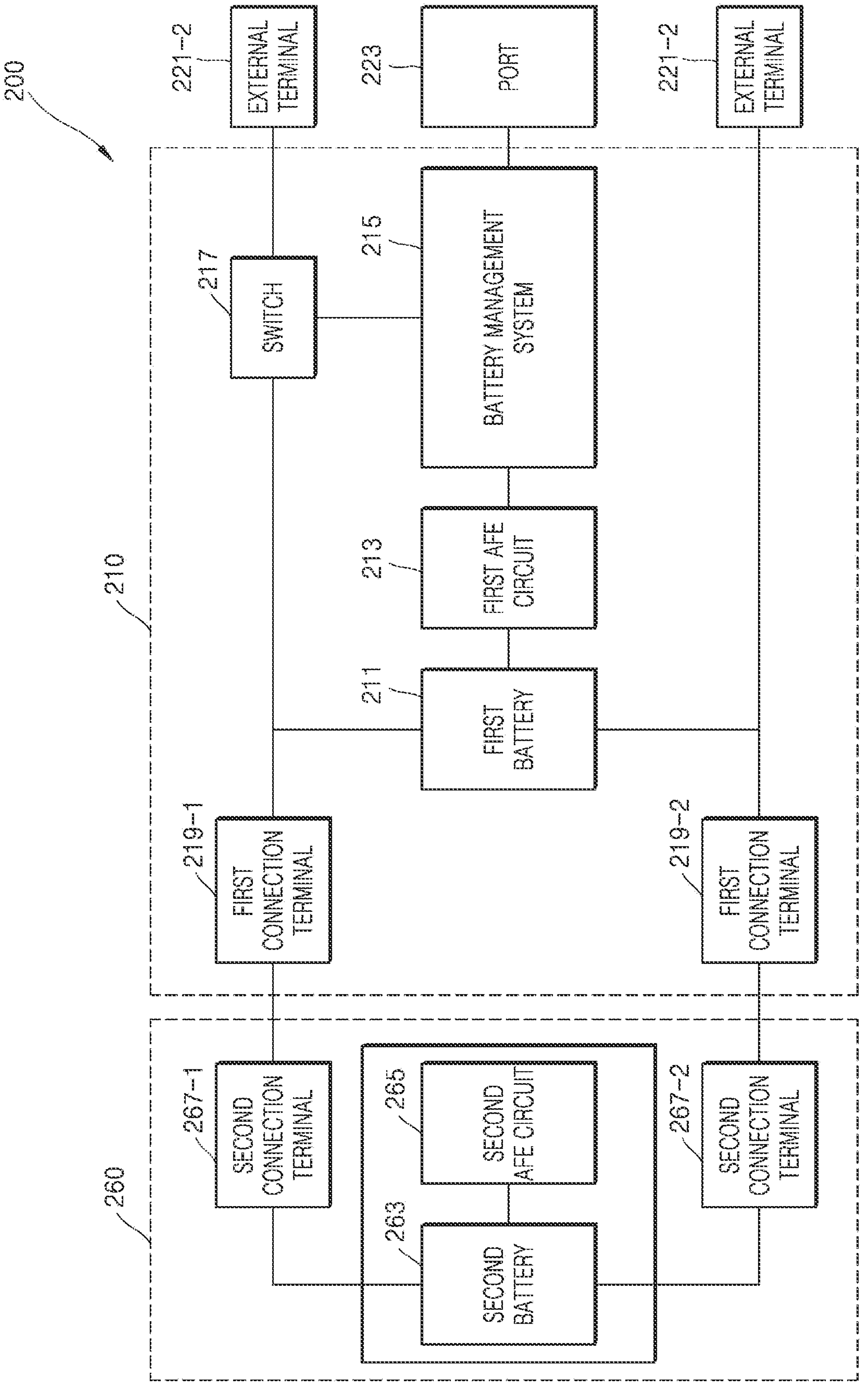
FIG. 2 illustrates a battery pack according to various embodiments of the disclosure.

FIG. 2 illustrates a battery pack 200 according to various embodiments of the disclosure. Referring to FIG. 2, the battery pack 200 may include an integrated module 210 and an extended battery module 260.

The integrated module 210 may include a first battery 211, a first AFE circuit 213, a battery management system (BMS) 215, a switch 217, first connection terminals 219-1 and 219-2, external terminals 221-1 and 221-2, and a port 223.

The first battery 211 may include a battery string of a plurality of battery cells connected in series. The battery cells connected in series may form a battery string, and a plurality of battery strings may be connected in parallel. According to some embodiments of the disclosure, a plurality of battery strings may be connected in parallel between the first connection terminals 219-1 and 219-2, and the first battery 211 may output a voltage of the battery string.

The first AFE circuit 213 may perform a function of checking the state of the first battery 211 and transmitting a check result to the BMS 215. According to some embodiments of the disclosure, the first AFE circuit 213 may generate first sensing data based on the state of the first battery 211, and transmit the first sensing data to the BMS 215. According to some embodiments of the disclosure, the first AFE circuit 213 may transmit battery information received from a memory where battery information about first battery 211 is stored, to the BMS 215. The battery information may include information about the number of battery strings. The battery information may further include at least one of identification information of the extended battery module 260 or information about the number of battery cells included in each of the battery strings.

The BMS 215 may receive state information about the battery cells, and perform a function of an integrated module. The BMS 215 may be referred to as the BMS. When the extended battery module 260 is connected to the integrated module 210 using the first connection terminals 219-1 and 219-2, the BMS 215 may perform an operation of controlling the extended battery module 260.

The extended battery module 260 may include a second battery 263, a second AFE circuit 265, and second connection terminals 267-1 and 267-2.

The second battery 263 may include a battery string of a plurality of battery cells connected in series. The battery strings may be connected in parallel between the second connection terminals 267-1 and 267-2, and the second battery 263 may output a voltage of the battery string. According to some embodiments of the disclosure, the number of battery strings of the second battery 263 may be different from the number of battery strings of the first battery 211.

The second AFE circuit 265 may perform a function of checking a state of the second battery 263, and transmitting a check result to the BMS 215. According to some embodiments of the disclosure, the second AFE circuit 265 may perform the same function as the first AFE circuit 213 of the integrated module 210.

The second connection terminals 267-1 and 267-2 may perform a function of connecting the extended battery module 260 to the integrated module 210. The second connection terminals 267-1 and 267-2 may be respectively connected to the first connection terminals 219-1 and 219-2 of the integrated module 210.

According to some embodiments of the disclosure, when the extended battery module 260 is connected to the integrated module 210, the BMS 215 may determine a current protection level based on the state of the first battery 211 and the state of the second battery 263. According to some embodiments of the disclosure, the BMS 215 may determine the current protection level based on the total number of the battery strings of the first battery 211 and the battery strings of the second battery 263. According to some embodiments of the disclosure, the BMS 215 may determine an overcharge current protection level or an overdischarge current protection level based on the total number of the battery strings of the first battery 211 and the battery strings of the second battery 263, and the temperature of the first battery 211 and the temperature of the second battery 263. The BMS 215 may determine the current protection level when the extended battery module 260 is connected to the first connection terminals 219-1 and 219-2, to be greater than the current protection level when the extended battery module 260 is not connected thereto.

According to some embodiments of the disclosure, when the extended battery module 260 is connected to the integrated module 210, the BMS 215 may perform an operation to protect a circuit. According to some embodiments of the disclosure, the BMS 215 may compare a total current of the first battery 211 and the second battery 263 connected in parallel with the current protection level, and control the switch 217 based on a result of the comparison. The BMS 215 may open the switch 217 when a total charge current of the first battery 211 and the second battery 263 is greater than an overcharge current protection level for a preset first time, or than an overdischarge current protection level for a preset second time. In response thereto, the BMS 215 may generate a control signal to block a current using the switch 217.

According to some embodiments of the disclosure, the BMS 215 may perform a battery protection operation based on the battery information received from the extended battery module 260. The BMS 215 may receive battery information. According to some embodiments of the disclosure, the battery information may include at least one of the identification information of the extended battery module 260 or information about the number of battery cells included in each battery string. According to some embodiments of the disclosure, the BMS 215 may compare the battery identification information obtained from the battery information with preset identification information, and when the obtained identification information does not match the preset identification information, open the switch 217 between one of a pair of the external terminals 221-1 and 221-2 and one of a pair of the first connection terminals 219-1 and 219-2, thereby protecting the battery pack 200. According to some embodiments of the disclosure, the identification information may include an identification (ID) of a battery cell, information about battery cells connected in series, information about battery cells connected in parallel, and the number of battery modules.

The first connection terminals 219-1 and 219-2 may enable the extended battery module 260 to be connected to the integrated module 210, the external terminals 221-1 and 221-2 may enable a load or a power supply unit to be connected to the integrated module 210, and the port 223 may enable communication between components of the integrated module 210, and components of the extended battery module 260.

A battery pack according to the related art may include a pair of external terminals. However, the battery pack 200 according to some embodiments of the disclosure may include additional connection terminal other than the external terminals 221-1 and 221-2, and may connect extended battery modules in parallel using the connection terminal, thereby increasing the total capacity of the battery pack 200. As the total capacity of the battery pack 200 is increased, a battery use time may be increased. Furthermore, in the battery pack 200 according to some embodiments of the disclosure, in a process of additionally connecting battery cells in parallel, even when extended battery modules with a different number of battery cells are added, the extended battery modules may be relatively stably operated through a current protection operation of the BMS.

Figure 3:
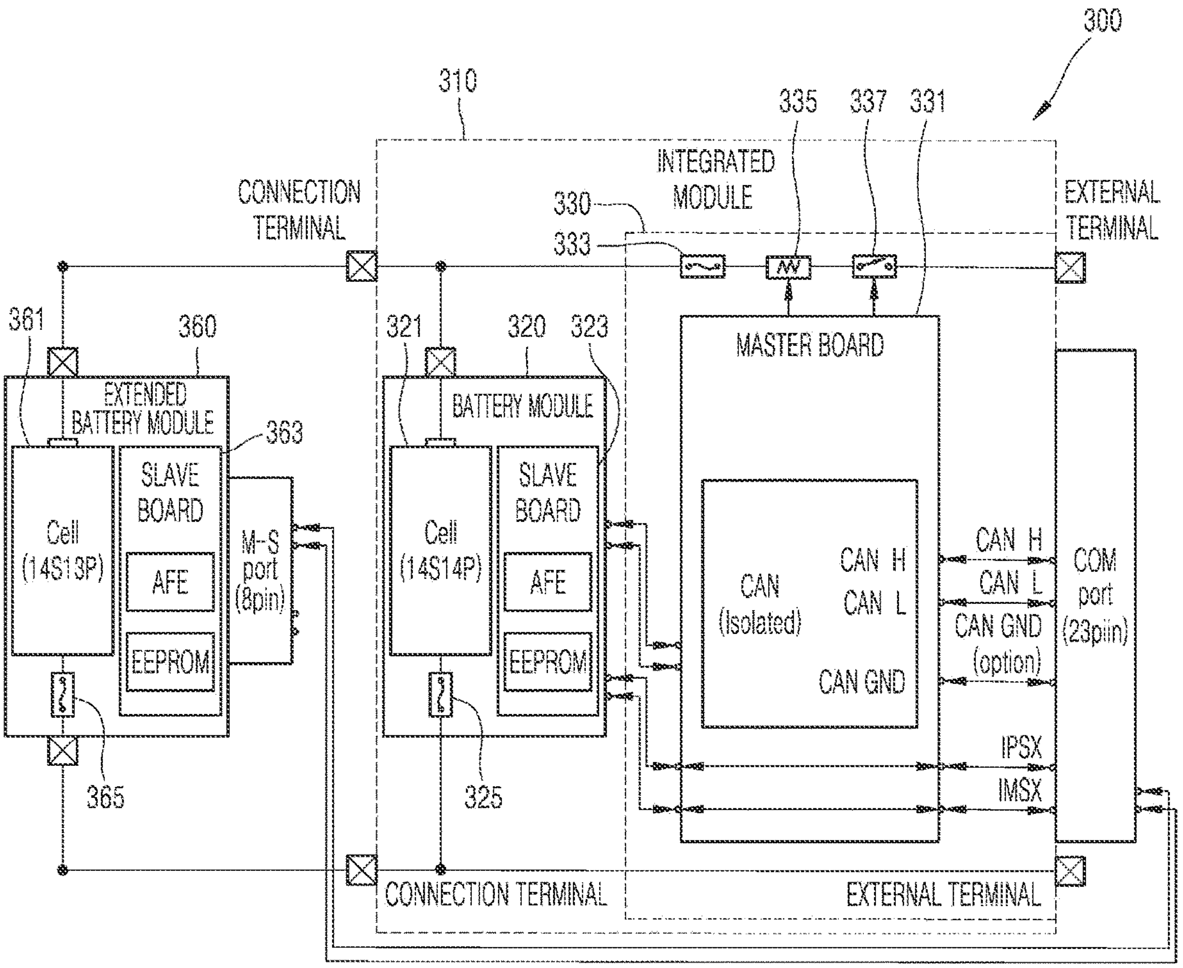
FIG. 3 is a view of an internal configuration of a battery pack according to various embodiments of the disclosure.

FIG. 3 is a view of an internal configuration 300 of the battery pack 200 according to various embodiments of the disclosure. FIG. 3 illustrates an example of a detailed configuration of the battery pack 200 of FIG. 2.

Referring to FIG. 3, the internal configuration 300 of the battery pack 200 may include an integrated module 310 and an extended battery module 360. The integrated module 310 and the extended battery module 360 of FIG. 3 may perform the same functions as the integrated module 210 and the extended battery module 260 of FIG. 2.

The integrated module 310 may include a battery module 320, a BMS 330, a port, connection terminals, and external terminals.

The battery module 320 may include a battery cell 321, a slave board 323, and a first fuse 325. The battery cell 321 illustrates a case in which fourteen (14) battery cells are connected in series forming one battery string, and fourteen (14) battery strings are connected in parallel (14S14P), but the number of battery cells connected in connected in series and in parallel may vary according to a user design. The slave board 323 may include an AFE circuit that detects the state of a battery cell, such as a temperature, a voltage, and the like, from the battery cell 321, and a memory that stores state information of a battery. According to some embodiments of the disclosure, the memory may include a non-volatile memory, a read only memory (ROM), and an electrically erasable programmable read only memory (EEPROM). Both end terminals of the battery cell 321 included in the battery module 320 may be electrically connected to a pair of connection terminals of the integrated module 310, respectively.

The BMS 330 may control an overall operation of the battery pack 200 using a master board 331. According to some embodiments of the disclosure, to control a current flowing in the battery pack 200, the BMS 330 may include a second fuse 333, a shunt-resistor (shunt-R) 335, and a relay switch 337.

The BMS 330 may receive information about the battery cell 321 from the AFE circuit of the battery module 320 and information about a battery cell 361 from an AFE circuit of the extended battery module 360. To receive information about the battery cells 321 and 361, the battery pack 200 may include a first communication line connected between the BMS 330 and the AFE circuit of the battery module 320, and a second communication line connected between the AFE circuit of the battery module 320 and the AFE circuit of the extended battery module 360. To form the second communication line, the battery module 320 may include a first communication terminal, and the extended battery module 360 may include a second communication terminal.

The information about the battery cell 321 may be transmitted to the BMS 330 using the first communication line, and the information about the battery cell 361 may be transmitted to the first AFE circuit 213 using the second communication line and to the BMS 330 using the first communication line. According to some embodiments of the disclosure, the BMS 330, the first AFE circuit, and the second AFE circuit may transceive data with respect to one another through the first communication line and the second communication line using a controller area network (CAN) protocol.

The extended battery module 360 refers to a battery cell module separated from the integrated module 310, and the extended battery module 360 may include the battery cell 361, a slave board 363, a second fuse 365, and a connection terminal to connect the extended battery module 360 to the integrated module 310. The constituent elements of the extended battery module 360 may perform the same functions as those corresponding to the battery module 320 of the integrated module 310. In this case, the battery cell 361 of the extended battery module 360 may include fourteen (14) battery cells connected in series, forming a battery string, and thirteen (13) battery strings are connected in parallel (14S13P). In other words, the number of battery strings in the battery cell 321 of the battery module 320 may be different from that of the battery strings in the battery cell 361 of the extended battery module 360.

According to some embodiments of the disclosure, when the extended battery module 360 is connected to the integrated module 310, the BMS 330 of the integrated module 310 may control the battery module 320 and the extended battery module 360. Even when the number of battery strings in the extended battery module 360 is different from the number of battery strings in battery module 320, the BMS 330 may check the number of battery cells connected in series and the number of battery strings in the whole battery pack 200, using the information about the battery cell stored in the memory in the extended battery module 360, and perform a BMS operation.

The BMS 330 may determine the current protection level of the battery pack 200 based on the state information received from the battery module 320 and the state information received from the extended battery module 360.

According to some embodiments of the disclosure, the BMS 330 may determine the current protection level based on the state information of the battery cell, and block a current flowing in the battery by comparing the total current of the battery with the current protection level. The BMS 330 may receive temperature information of the battery cell 321 of the battery module 320 and temperature information of the battery cell 361 of the extended battery module 360, and determine an overcharge current protection level based on the received temperature information, and the total number of battery strings in the battery cell 321 and the battery cell 361. According to some embodiments of the disclosure, the BMS 330 may determine the current protection level to prevent or reduce instances of overcharge of the battery pack 200, based on the number of battery strings of the battery module 320, the number of battery strings of the extended battery module 360, and the temperature of the battery cells. The BMS 330 may protect the battery pack 200 by controlling the switch through a comparison of a current flowing in the battery with the current protection level. According to some embodiments of the disclosure, the BMS 330 may stably control the battery pack 200 by determining the current protection level when the extended battery module 360 is connected, to be greater than the current protection level when the extended battery module 360 is not connected.

According to some embodiments of the disclosure, the BMS 330 may determine the overdischarge current protection level based on the number of battery strings of the battery module 320 and the total number of battery strings of the extended battery module 360, and control the switch to be open when the total discharge current of the battery module 320 and the extended battery module 360 is less than the overdischarge current protection level for the preset first time. According to some embodiments of the disclosure, the BMS 330 may determine the overcharge current protection level based on the number of battery strings of the battery module 320 and the total number of battery strings of the extended battery module 360, and control the switch to be open when the total charge current of the battery module 320 and the extended battery module 360 is greater than the overcharge current protection level for a preset second time.

The BMS 330 may perform the battery protection operation based on the battery information received from the extended battery module 360. According to some embodiments of the disclosure, the battery information may include information about the number of battery strings in the battery cell 361. According to some embodiments of the disclosure, the battery information may include at least one of the identification information of the extended battery module 360 or the information about the number of battery cells included in each battery string. According to some embodiments of the disclosure, the BMS 330 may compare the battery identification information obtained from the battery information with the preset identification information, and when the obtained identification information does not match the preset identification information, open the switch between one of a pair of the external terminals 221-1 and 221-2 and one of a pair of the first connection terminals 219-1 and 219-2, thereby protecting the battery pack 200. According to some embodiments of the disclosure, the identification information may include identification (ID) of a battery cell, information about battery cells connected in series, information about battery cells connected in parallel, and the number of battery modules.

Figure 4:
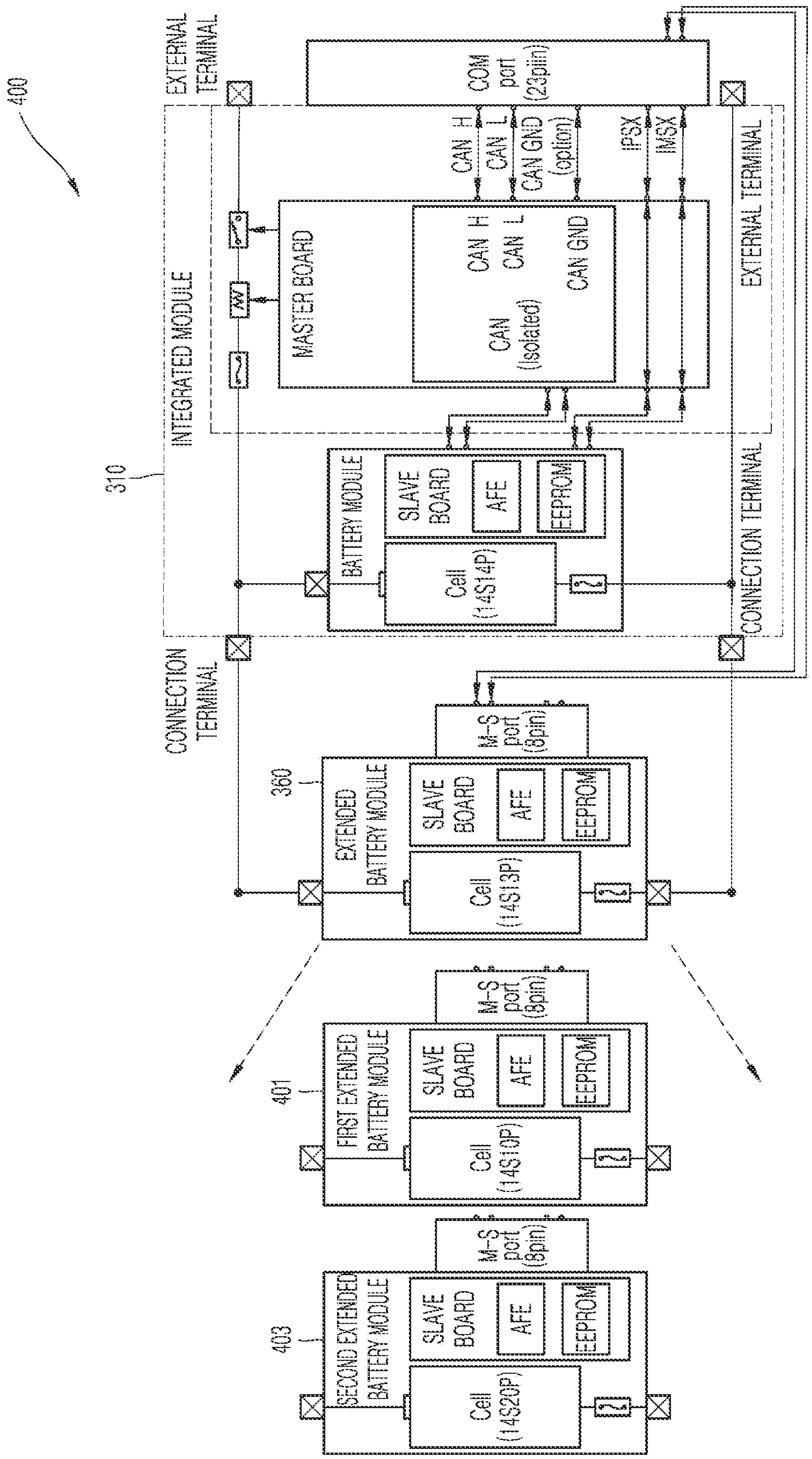
FIG. 4 illustrates a battery pack connected to a plurality of extended battery modules, according to various embodiments of the disclosure.

FIG. 4 illustrates a battery pack 400 connected to a plurality of extended battery modules, according to various embodiments of the disclosure. In FIG. 4, the integrated module 310 and the extended battery module 360 respectively perform the same function as the integrated module 310 and the extended battery module 360 of FIG. 3.

FIG. 4 illustrates a case in which a plurality of extended battery modules are provided. Referring to FIG. 4, at least one of a first extended battery module 401 or a second extended battery module 403 may be connected in parallel to the connection terminals of the extended battery module 360. According to some embodiments of the disclosure, when the one extended battery module 360 is connected to the integrated module 310, at least one of the first extended battery module 401 or the second extended battery module 403 may be additionally connected. The first extended battery module 401 and the second extended battery module 403 may perform the same function as the extended battery module 360, and may be connected to the integrated module 310 in the same method as the extended battery module 360.

According to some embodiments of the disclosure, the integrated module 310 may be used as one independent pack, and the extended battery module 360 may be used by being connected in parallel to the integrated module 310. Accordingly, the capacity of the battery pack 400 may be increased. An extended battery module in which the number of battery cells connected in series in the extended battery module is the same and the number of battery strings is different may be connected to the integrated module 301 and controlled as one battery through the BMS.

Figure 5:
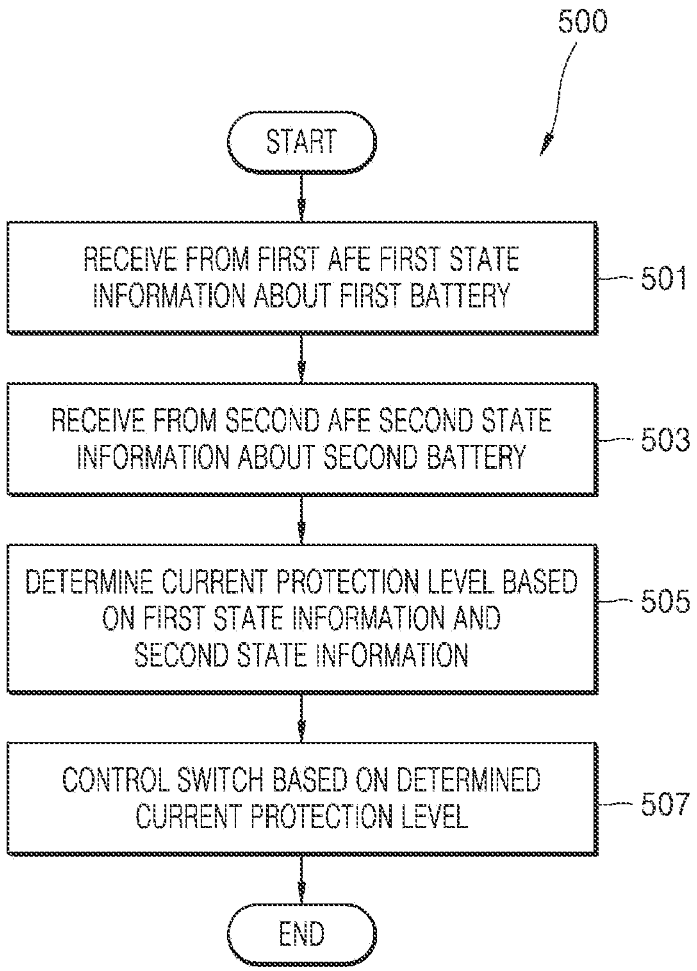
FIG. 5 is a flowchart of a method of operating a battery management system, according to various embodiments of the disclosure.

FIG. 5 is a flowchart 500 of a method of operating a BMS, according to various embodiments of the disclosure. According to some embodiments, the number of operations and/or the order of the operations illustrated in FIG. 5 may vary, such that some embodiments may include additional operations or fewer operations, or the order of operations may vary, without departing from the spirit and scope of embodiments according to the present disclosure. FIG. 5 illustrates a method of operating the BMS 215 when the extended battery module is connected to the integrated module through the connection terminals.

Referring to FIG. 5, in operation 501, the BMS 215 may receive, from the first AFE, first state information about the first battery. The first state information may include at least one of the temperature information or voltage information of the first battery. According to some embodiments of the disclosure, the first state information may further include information indicating the number of battery strings of the first battery 211.

In operation 503, the BMS 215 may receive from the second AFE second state information about the second battery. According to some embodiments of the disclosure, the second state information may include state information corresponding to the first state information, with respect to the extended battery module.

In operation 505, the BMS 215 determines a current protection level based on the first state information and the second state information. According to some embodiments of the disclosure, the BMS 215 may determine a current protection level of a battery pack based on the first state information and the second state information. According to some embodiments of the disclosure, the BMS 215 may determine an overcharge current protection level based on the temperature information of the first battery and the second battery, the number of battery strings of the first battery, and the number of battery strings of the second battery. According to some embodiments of the disclosure, the BMS 215 may determine an overdischarge current protection level based on the temperature information of the first battery and the second battery, the number of battery strings of the first battery, and the number of battery strings of the second battery. According to some embodiments of the disclosure, the BMS 215 may determine the current protection level when the extended battery module is connected to be greater than the current protection level when the extended battery module is not connected.

In operation 507, the BMS 215 may control the switch based on the determined current protection level. According to some embodiments of the disclosure, the BMS 215 may block the current flowing in the battery by comparing the total current of the battery with the current protection level. The BMS 215 may compare the current flowing in the battery with the current protection level, and control the switch arranged between one of a pair of the external terminals and one of a pair of the first connection terminals.

According to some embodiments of the disclosure, the BMS 215 may control the switch to be open when the total discharge current of the first battery and the second battery is less than the overdischarge current protection level for the preset first time. According to some embodiments of the disclosure, the BMS 215 may control the switch to be open when the total charge current of the first battery and the second battery is greater than the overcharge current protection level for the preset second time.

According to some embodiments of the disclosure, the BMS 215 may perform the battery protection operation based on the battery information received from the extended battery module. The BMS 215 may receive the battery information. According to some embodiments of the disclosure, the battery information may include at least one of the identification information of the extended battery module or the information about the number of battery cells included in each battery string. According to some embodiments of the disclosure, the BMS 215 may compare the battery identification information obtained from the battery information with the preset identification information, and when the obtained identification information does not match the preset identification information, open the switch between one of a pair of the external terminals and one of a pair of the first connection terminals, thereby protecting the battery pack. According to some embodiments of the disclosure, the identification information may an include ID of a battery cell, information about battery cells connected in series, information about battery cells connected in parallel, and the number of battery modules.

According to various embodiments of the disclosure, the battery pack and the method of controlling the battery pack may extend battery capacity of the battery pack by using the extended battery module.

According to various embodiments of the disclosure, the battery pack and the method of controlling the battery pack may increase use time of a battery by using the extended battery module.

According to various embodiments of the disclosure, the battery pack and the method of controlling the battery pack may relatively stably control the extended battery module by determining the current protection level when battery capacity is extended using the extended battery module.

The characteristics of embodiments according to the present disclosure are not limited to the above-described characteristics, and other various effects that are not described in the specification may be more clearly understood from the following descriptions by one skilled in the art to which the present disclosure belongs.

The methods according to claims or embodiments described in the specification of the disclosure may be implemented by hardware, software, or a combination of hardware and software.

When implemented by software, a computer-readable storage medium for storing one or more programs (software modules) may be provided. The one or more programs stored in the computer-readable storage medium may be configured for execution by one or more processors in an electronic device. The one or more programs include instructions to allow an electronic device to perform methods according to claims or embodiments described in the specification of the disclosure.

Such programs (software modules or software) may be stored in random access memory, non-volatile memory including flash memory, read only memory (ROM), electrically erasable programmable ROM (EEPROM), magnetic disc storage devices, compact disc-ROM (CD-ROM), digital versatile discs (DVDs), different forms of optical storage devices, or magnetic cassettes. Alternatively, one or more programs may be stored in a memory configured with a combination of parts or whole thereof. Furthermore, each component memory may include a plurality of component memories.

Furthermore, the program may be stored in an attachable storage device that is accessible through a communication network such as the Internet, the Intranet, a local area network (LAN), a wide area network (WAN), or a storage area network (SAN), or a combination thereof. Such a storage device may be connected to a device performing an embodiment of the disclosure through an external port. Furthermore, a separate storage device on the communication network may be connected to a device carrying out the embodiment of the disclosure.

According to some embodiments of the above-described the disclosure, constituent elements included in the disclosure are expressed in singular or plural according to the presented specific embodiments. However, the singular or plural expression is selected as appropriate for the presented situation, for convenience of explanation, and embodiments according to the present disclosure are not limited to a singular or plural constituent elements, and even if the constituent elements expressed in plural may be composed of a single constituent element, or a constituent element expressed in singular may be composed of a plurality of constituent elements.

In the detailed description of the disclosure, although specific embodiments are described, various modifications may be possible without departing from the spirit and scope of embodiments according to the present disclosure. Therefore, the scope of embodiments according to the present disclosure should not be limited to the described embodiments and should be defined by the claims described below as well as equivalents to the claims.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims, and their equivalents.

What is claimed is:

1. A battery pack comprising:

a pair of external terminals;

a pair of first connection terminals;

a first battery comprising a plurality of first battery strings connected in parallel between the pair of first connection terminals, each of the plurality of first battery strings comprising a plurality of first battery cells connected in series;

at least one extended battery module comprising a pair of second connection terminals detachably connected to the pair of first connection terminals, and a second battery comprising a plurality of second battery strings connected in parallel between the pair of second connection terminals, each of the plurality of second battery strings comprising a plurality of second battery cells connected in series;

a battery management system (BMS) configured to determine a current protection level based on a total number of the plurality of first battery strings and the plurality of second battery strings, in response to the extended battery module being connected to the pair of first connection terminals; and a switch between one of the pair of external terminals and one of the pair of first connection terminals, wherein the battery management system is further configured to compare a total current of the first battery and the second battery connected in parallel to each other with the current protection level, and to open the switch in response to the total current being greater than the current protection level, and wherein the battery management system is further configured to compare identification information received from the at least one extended battery module with preset identification information stored in the battery management system, the identification information comprising an identification of a battery cell of the second battery, information about the plurality of second battery cells connected in series, information about the plurality of second battery strings connected in parallel, or a number of the at least one extended battery module, wherein the battery management system is configured to open a switch between one of the pair of external terminals and one of the pair of first connection terminals in response to the identification information not matching the preset identification information, wherein the battery management system is configured to determine an overcharge current protection level based on the total number of the plurality of first battery strings and the plurality of second battery strings, a temperature of the first battery, and a temperature of the second battery, and to open the switch in response to a total charge current of the first battery and the second battery being greater than the overcharge current protection level for a preset second time.

2. The battery pack of claim 1, further comprising a first analog front end (AFE) circuit configured to generate first sensing data by detecting a state of the plurality of first battery cells in the first battery, and to transmit the first sensing data to the battery management system, wherein each of the plurality of second battery strings comprises a plurality of second battery cells connected in series, and wherein the extended battery module comprises a second AFE circuit configured to generate second sensing data by detecting a state of the plurality of second battery cells in the second battery, and to transmit the second sensing data to the battery management system.

3. The battery pack of claim 2, further comprising:

a first communication line between the battery management system and the first AFE circuit; and a second communication line configured to connect between the first AFE circuit and the second AFE circuit in response to the extended battery module being connected to the pair of first connection terminals.

4. The battery pack of claim 3, wherein the second sensing data is transmitted to the battery management system through the second communication line and the first communication line.

5. The battery pack of claim 3, further comprising a first communication terminal, wherein the extended battery module further comprises a second communication terminal connected to the first communication terminal, and the second communication line is configured as the first communication terminal and the second communication terminal are electrically connected to each other.

6. The battery pack of claim 3, wherein the battery management system, the first AFE circuit, and the second AFE circuit are configured to transceive data with respect to one another through the first communication line and the second communication line using a controller area network (CAN) protocol.

7. The battery pack of claim 2, wherein the first AFE circuit is configured to detect the temperature of the first battery and to transmit the temperature of the first battery to the battery management system, the second AFE circuit is configured to detect the temperature of the second battery and to transmit the temperature of the second battery to the battery management system.

8. The battery pack of claim 2, wherein the second AFE circuit comprises a memory storing battery information about the second battery, and the second AFE circuit is configured to transmit the battery information to the battery management system in response to the extended battery module being connected to the pair of first connection terminals.

9. The battery pack of claim 8, wherein the battery information comprises information about a number of the plurality of second battery strings.

10. The battery pack of claim 9, wherein the battery information comprises at least one of the identification information of the extended battery module or information about a number of the plurality of second battery cells included in each of the plurality of second battery strings.

11. The battery pack of claim 1, wherein a number of the plurality of first battery strings is different from a number of the plurality of second battery strings.

12. The battery pack of claim 11, wherein the battery management system is further configured to determine an overdischarge current protection level based on the total number of the plurality of first battery strings and the plurality of second battery strings, and to open the switch in response to a total charge current of the first battery and the second battery being less than the overdischarge current protection level for a preset first time.

13. The battery pack of claim 1, wherein the battery management system is further configured to determine a current protection level in response to the extended battery module being connected to the pair of first connection terminals, to be greater than a current protection level in response to the extended battery module not being connected to the pair of first connection terminals.

14. The battery pack of claim 1, wherein the at least one extended battery module comprises a first extended battery module and a re-extended battery module comprising a pair of third connection terminals and a third battery comprising a plurality of third battery strings connected in parallel between the pair of third connection terminals, wherein the first extended battery module further comprises a pair of fourth connection terminals respectively connected to the pair of second connection terminals, and the pair of fourth connection terminals are connected to the pair of third connection terminals in response to the re-extended battery module being mounted on the first extended battery module.

* * * * *